(12) United States Patent
Ratcliffe et al.

(10) Patent No.: US 10,883,325 B2
(45) Date of Patent: Jan. 5, 2021

(54) ARM DEPLOYMENT SYSTEM AND METHOD

(71) Applicant: Sondex Wireline Limited, Farnborough (GB)

(72) Inventors: James David Ratcliffe, Farnborough (GB); Timothy Michael Gill, Farnborough (GB)

(73) Assignee: Sondex Wireline Limited, Farnborough (GB)

( * ) Notice: Subject to any disclaimer, the term of this patent is extended or adjusted under 35 U.S.C. 154(b) by 241 days.

(21) Appl. No.: 16/013,359

(22) Filed: Jun. 20, 2018

(65) Prior Publication Data

US 2018/0363397 A1 Dec. 20, 2018

Related U.S. Application Data

(60) Provisional application No. 62/522,326, filed on Jun. 20, 2017.

(51) Int. Cl.
*E21B 23/00* (2006.01)
*F16H 21/44* (2006.01)

(52) U.S. Cl.
CPC .......... *E21B 23/001* (2020.05); *F16H 21/44* (2013.01)

(58) Field of Classification Search
CPC .... E21B 4/18; E21B 2023/008; E21B 23/008; F16H 21/44
See application file for complete search history.

(56) References Cited

U.S. PATENT DOCUMENTS

| | | |
|---|---|---|
| 4,184,546 A | 1/1980 | Nicolas et al. |
| 4,715,440 A | 12/1987 | Boxell et al. |
| 4,926,937 A | 5/1990 | Hademenos |
| 5,086,645 A | 2/1992 | Deaton |
| 5,092,056 A | 3/1992 | Deaton |
| 5,548,900 A | 8/1996 | Hunt-Grubbe |
| 5,574,263 A | 11/1996 | Roesner |
| 6,629,568 B2 | 10/2003 | Post et al. |
| 6,910,533 B2 | 6/2005 | Guerrero |
| 6,920,936 B2 | 7/2005 | Sheiretov et al. |
| 7,114,386 B1 | 10/2006 | Veignat et al. |

(Continued)

FOREIGN PATENT DOCUMENTS

| | | |
|---|---|---|
| CN | 201090208 | 7/2008 |
| WO | 2016/159780 | 10/2016 |

OTHER PUBLICATIONS

International Search Report and Written Opinion issued in connection with corresponding PCT Application No. PCT/US2018/038592 dated Oct. 19, 2018.

(Continued)

*Primary Examiner* — Robert E Fuller
(74) *Attorney, Agent, or Firm* — Hogan Lovells US LLP

(57) ABSTRACT

Embodiments of the present disclosure include a deployment system including an actuator. The deployment system also includes an actuator arm coupled to the actuator. The deployment system further includes a crank rotatably coupled at a pivot point. The deployment system also includes a first link arm coupled to the actuator arm at a first end and the crank at a second end. The deployment system includes a second link arm coupled to the crank at a first end and a deployment arm at a second end, the second link arm transmitting rotational movement of the crank to the deployment arm.

17 Claims, 20 Drawing Sheets

(56) References Cited

U.S. PATENT DOCUMENTS

| | | |
|---|---|---|
| 7,281,578 B2 | 10/2007 | Nakajima et al. |
| 7,293,746 B2 | 11/2007 | Brundage |
| 7,334,642 B2 | 2/2008 | Doering et al. |
| 7,694,735 B2 | 4/2010 | Haheim et al. |
| 7,954,563 B2 | 6/2011 | Mock et al. |
| 8,579,037 B2 | 11/2013 | Jacob |
| 9,097,100 B2 | 8/2015 | Finke |
| 2005/0145415 A1 | 7/2005 | Doering et al. |
| 2011/0127046 A1 | 6/2011 | Aguirre et al. |
| 2013/0068479 A1 | 3/2013 | AlDossary |
| 2015/0211312 A1 | 7/2015 | Krueger, V |
| 2016/0130935 A1 | 5/2016 | Manzar et al. |

OTHER PUBLICATIONS

"MaxTRAC Downhole Wireline Tractor System," 2018, Schlumberger Limited, https://www.slb.com/services/production/production_logging/conveyance/maxtrac_downhole_well_tractor.aspx.

"Multiple Array Production Suite," 2018, General Electric, https://www.geoilandgas.com/oilfield/wireline-technology/multiple-array-production-suite.

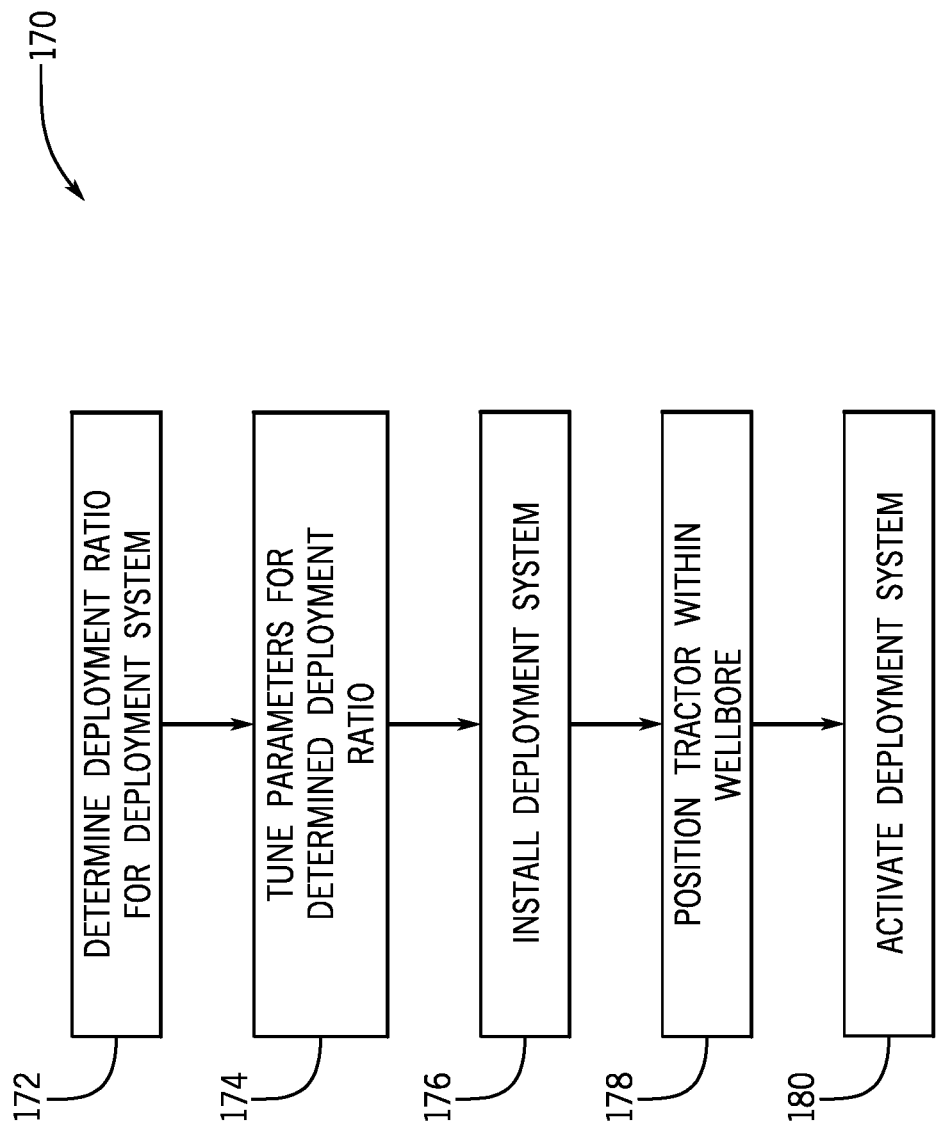

ARM DEPLOYMENT SYSTEM AND METHOD

CROSS REFERENCE TO RELATED APPLICATION

This application claims priority to and the benefit of: U.S. Provisional Application Ser. No. 62/522,326 filed Jun. 20, 2017, titled "ARM DEPLOYMENT SYSTEM AND METHOD," the full disclosure of which is hereby incorporated herein by reference in its entirety for all purposes.

BACKGROUND

1. Field of Invention

This disclosure relates in general to oil and gas tools, and in particular, to systems and methods for tractor drive arm deployment from downhole tools.

2. Description of the Prior Art

In oil and gas production, some downhole operations, such as wireline logging, may utilize tractors to facilitate deployment of logging tools in substantially horizontal wells. With horizontal wells, the force of gravity may be insufficient to pull tools downhole. As such, tractors may be used to pull tools along deviated well bores. Drive arms extend outwardly from the tractor and contact the wellbore. However, tractors may utilize complicated linkage deployment systems and may not be capable of use in a wide variety of wellbores. Different deployment arm sizes may be used for different sized wellbores, to optimize the contact force between the wheel and the well, as with a simple deployment mechanism, low deployment forces are typically achieved in small pipe diameters and very high forces in large pipe diameters. Designs using several lengths of deployment arm are expensive and time consuming, as the operator stocks multiple drive arm sets and changes to the correct set for the current well diameter each time the tractor runs in hole.

SUMMARY

Applicant recognized the problems noted above herein and conceived and developed embodiments of systems and methods, according to the present disclosure, for tractor arm deployment systems.

In an embodiment a system for radially extending a deployment arm of a downhole tractor includes an actuator that supplies a linear force along a tractor axis. The system also includes an actuator arm coupled to the actuator at a first end and a first link arm at the second end, the actuator arm translating the linear force to the first link arm. The system further includes a crank rotationally coupled to a housing of the downhole tractor, the crank being coupled to the first link arm. The system includes a second link arm coupled to the crank at a first end and to the deployment arm at a second end, the second link arm translating rotational movement of the crank to the deployment arm to drive rotational movement of the deployment arm about a deployment axis.

In another embodiment a deployment system for a tractor includes an actuator, the actuator providing force in a linear direction substantially parallel to a tractor axis. The deployment system also includes an actuator arm coupled to the actuator. The deployment system further includes a crank rotatably coupled to at least a portion of the tractor at a pivot point. The deployment system also includes a first link arm coupled to the actuator arm at a first end and the crank at a second end, the coupling to the crank being proximate a top of the tractor and substantially aligned with the pivot point. The deployment system includes a second link arm coupled to the crank at a first end and a deployment arm at a second end, the second link arm transmitting rotational movement of the crank to the deployment arm.

In an embodiment a method for installing a deployment system includes determining a deployment ratio. The method also includes tuning one or more parameters of the deployment system based on the determined deployment ratio. The method further includes installing the deployment system in a downhole tool. The method also includes activating the deployment system to drive rotational movement of a deployment arm of a tractor.

BRIEF DESCRIPTION OF THE DRAWINGS

The present technology will be better understood on reading the following detailed description of non-limiting embodiments thereof, and on examining the accompanying drawings, in which:

FIG. 20 is a flow chart of an embodiment of a method for using a deployment system with a downhole tool, in accordance with embodiments of the present disclosure.

DETAILED DESCRIPTION OF THE INVENTION

Figure 1:
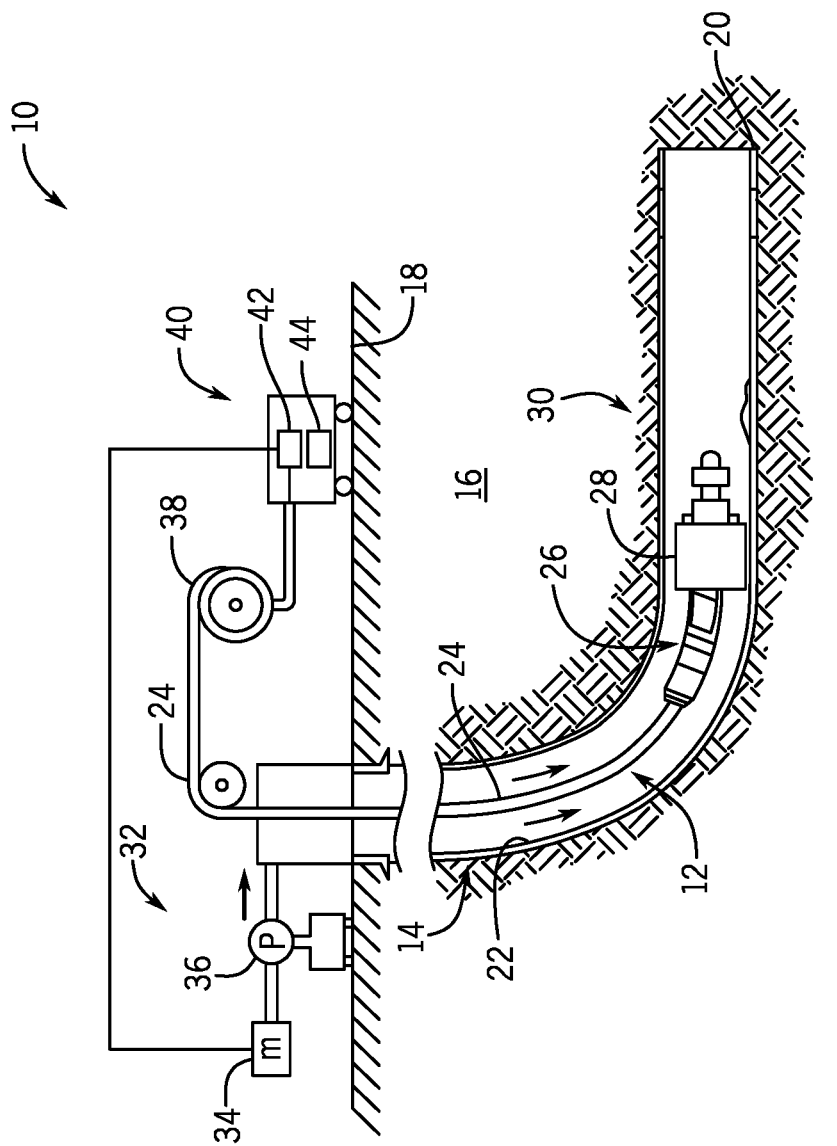
FIG. 1 is a schematic elevation view of an embodiment of a wellbore system, in accordance with embodiments of the present disclosure.

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

Embodiments of the present disclosure include a tractor having deployable tractor arms driven by a deployment system. In various embodiments, the deployment system converts a linear force applied by an actuator into rotational movement for deploying the tractor arms to a deployed position where a wheel of the deployment arm is radially displaced from a tractor axis. In various embodiments, the deployment system may include an actuator arm that drives rotation of a crank via a coupling to a first link arm. Force from the actuator may be applied to the first link arm, which transmits the force to the crank to drive rotation about a pivot point. The deployment system may further include a second link arm coupled to the crank and to the deployment arm. As the crank rotates, the force is transmitted to the second link arm, which drives rotational movement of the deployment arm from a stored position to the deployed position.

FIG. 1 is a schematic elevation view of an embodiment of a wellbore system 10 that includes a work string 12 (e.g., tool string) shown conveyed in a wellbore 14 formed in a formation 16 from a surface location 18 to a depth 20. The wellbore 14 is shown lined with a casing 22, however it should be appreciated that in other embodiments the wellbore 14 may not be cased. In various embodiments, the work string 12 includes a conveying member 24, such as an electric wireline, and a downhole tool or assembly 26 (also referred to as the bottomhole assembly or "BHA") attached to the bottom end of the wireline. The illustrated downhole assembly 26 includes various tools, sensors, measurement devices, communication devices, and the like, which will not all be described for clarity. In various embodiments, the downhole assembly 26 includes a tractor 28, for facilitating movement of the downhole assembly 26 in a horizontal or deviated portion 30 of the wellbore 14.

The illustrated embodiment further includes a fluid pumping system 32 at the surface 18 that includes a motor 34 that drives a pump 36 to pump a fluid from a source into the wellbore 14 via a supply line or conduit. To control the rate of travel of the downhole assembly, tension on the wireline 24 is controlled at a winch 38 on the surface. Thus, the combination of the fluid flow rate and the tension on the wireline may contribute to the travel rate or rate of penetration of the downhole assembly 16 into the wellbore 24. The wireline 24 may be an armored cable that includes conductors for supplying electrical energy (power) to downhole devices and communication links for providing two-way communication between the downhole tool and surface devices. In aspects, a controller 40 at the surface is provided to control the operation of the pump 36 and the winch 38 to control the fluid flow rate into the wellbore and the tension on the wireline 24. In various embodiments, the controller 40 may be a computer-based system that may include a processor 42, such as a microprocessor, a storage device 44, such as a memory device, and programs and instructions, accessible to the processor for executing the instructions utilizing the data stored in the memory 44.

In various embodiments, the fluid pressure provided by the pump 36 may be insufficient to smoothly and continuously facilitate movement of the BHA 26. Accordingly, in various embodiments, the tractor 28 may be utilized to deploy wheels that engage the walls of the wellbore 14 to facilitate movement of the BHA 26. It should be appreciated that, in various embodiments, the force that the wheels engage the walls of the wellbore 14 may impact the movement of the BHA 26. For example, a force below a threshold amount may be insufficient to engage the walls and the wheels may slip, thereby not transmitting force to the walls and not helping move the BHA 26 along the wellbore 14. However, too large a force will generate significant friction, thereby wasting energy. Accordingly, in various embodiments, systems and methods for deploying the wheels for engaging the wellbore 14 are described. These systems and methods may facilitate a constant output relationship between wheel deployment and input force, an increasing output, or a decreasing output.

Figure 2:
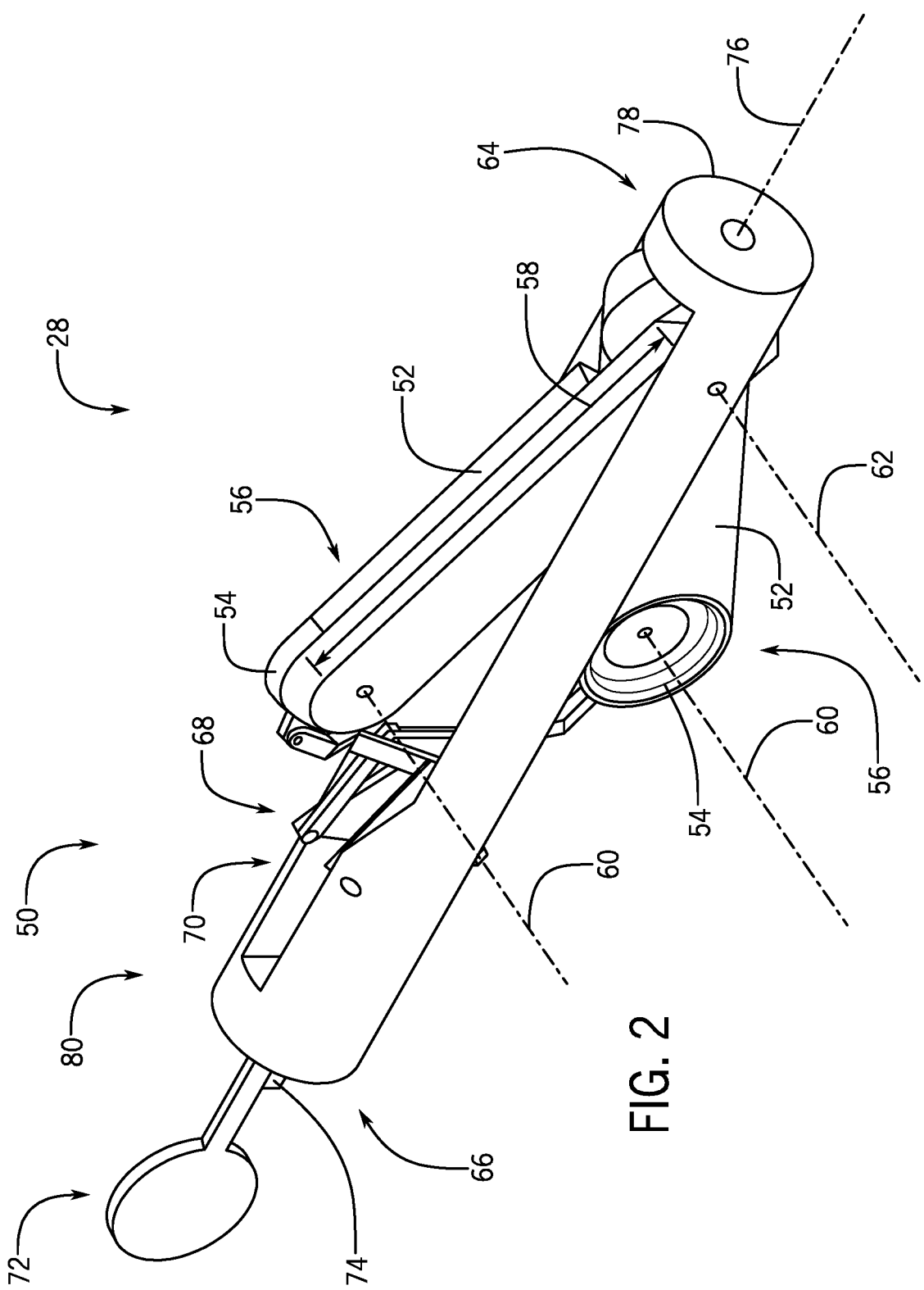
FIG. 2 is a schematic side view of an embodiment of a downhole tooling having a deployment system, in accordance with embodiments of the present disclosure.

FIG. 2 is an isometric view of an embodiment of the tractor 28 that may be associated with the BHA 26. It should be appreciated that various components of the BHA 26 and tractor 28 have been simplified for clarity in describing a deployment system 50. The tractor 28 includes deployment arms 52 (e.g., arms) having wheels 54 attached at a far end 56 thereof. It should be appreciated that while the illustrated embodiment includes a single wheel 54 on each arm 52, that in other embodiments the arms 52 may include multiple wheels 54 arranged along any portion of a length 58 of the arms 52. The illustrated wheels 54 are configured to rotate about a respective axis 60 to facilitate driving the BHA 26 along the wellbore 14. The deployment arms 52 rotate about a deployment axis 62 arranged at a first end 64 of the tractor 28, opposite a second end 66. In the illustrated embodiment, two deployment arms 52 are arranged to rotate about the same deployment axis 62 and are substantially aligned. It should be appreciated that in certain embodiments there may be a single deployment arm 52 rotating about the deployment axis 62 or there may be more deployment arms 52 rotating about the deployment axis 62. That is, any number of arms 52 may be staggered along the length of the tractor 28 to thereby position the wheels 54 at different locations along the length. Such an arrangement may reduce stresses or forces acting on the tractor 28.

In the illustrated embodiment, the deployment system 50 is arranged at the second end 66 and includes linkages 68, a crank 70, and an actuator 72. The illustrated actuator 72 is simplified and may include a motor, spring, linear actuator, or any reasonable device for translating linear motion. In embodiments, the actuator 72 includes one or more sensors 74, such as position sensors. These sensors may be utilized to determine a radial position of the arms, relative to a tool axis 76, based on a linear position of the actuator 72. As such, if a wellbore had a variety of diameters, the actuator 72 could be configured to be in a first position corresponding to a first diameter and in a second position corresponding to a second diameter, thereby enabling improved operations in the wellbore.

In the illustrated embodiment, the tractor 28 includes a housing 78 having an opening 80 to facilitate translation of the arms 52 radially outward from the tool axis 76. It should be appreciated that components of the deployment system 50, such as the linkages 68 and/or the crank 70 may also translate out of the opening 80. As shown, the opening 80 extends through the housing 78 such that the arms 52 may be deployed on substantially opposite sides of the tractor 28.

Figure 3:
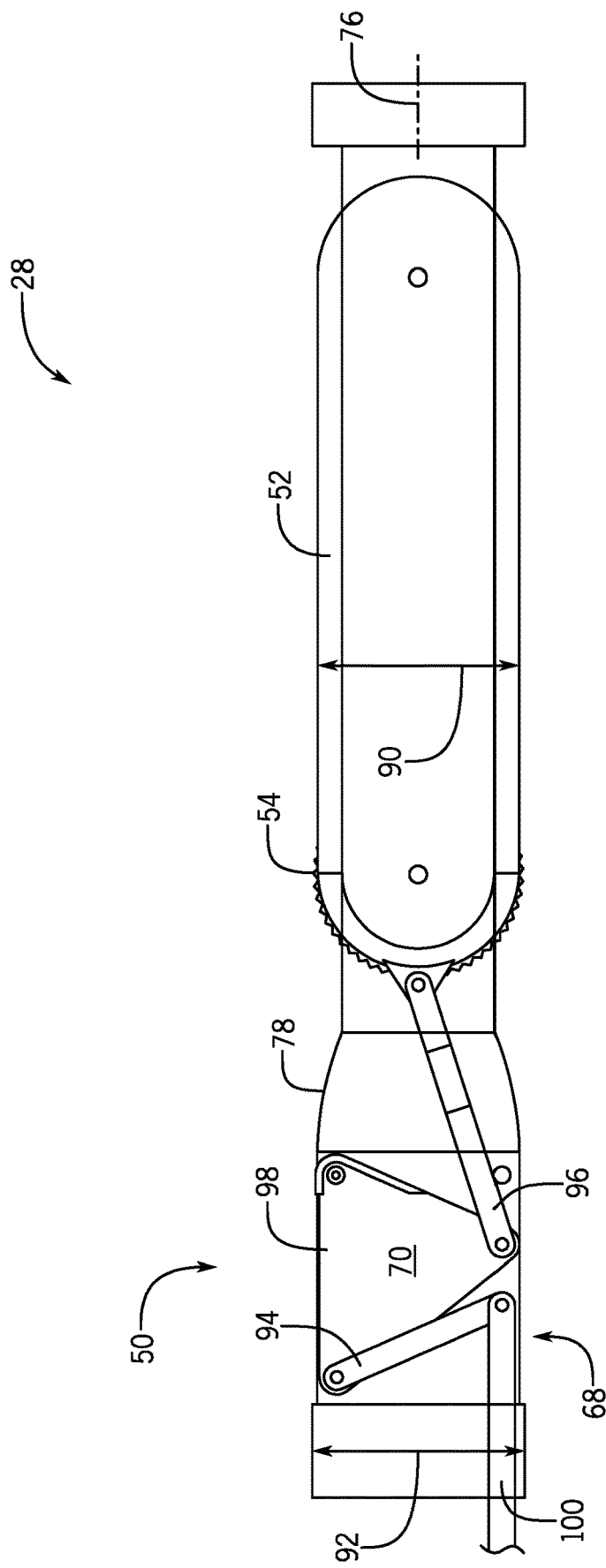
FIG. 3 is a schematic side view of an embodiment of a downhole tooling having a deployment system, in accordance with embodiments of the present disclosure.

FIG. 3 is a schematic side elevation view of an embodiment of the tractor 28 in which the housing 78 is partially see through and/or removed in order to better illustrate certain aspects of the tractor 28. In the illustrated embodiment, the wheel 54 and/or arms 52 may be referred to as being in a stored position. That is, an outer diameter 90 of the arms 52 may be substantially aligned with an outer diameter 92 of the housing 78. FIG. 3 further illustrates that the deployment system 50 is almost wholly arranged within the housing 78. That is, the linkages 68, crank 70, and at least a portion of the actuator 72 are arranged such that the outer diameter 92 of the housing 78 extends farther radially outward from the tool axis 76. It should be appreciated that in certain situations, for example when the tool is being deployed into the wellbore, that a reduced diameter may be desirable. As such, the stored position is arranged to reduce the overall diameter of the tool.

The illustrated deployment system 50 includes the linkages 68 comprised of a first link arm 94, a second link arm 96, a bell crank 98, and an actuator arm 100. In various embodiments, the actuator arm 100 is coupled to the actuator 72 and translates a lateral force from the actuator 72 to the first link arm 94, which translates that force to the bell crank 98. As will be described below, lateral force from the actuator 72 transitions the arm 52 from the illustrated stored position to a deployed position where the arm 52 and the wheel 54 are radially displaced outward from the tool axis 76.

As illustrated in FIG. 3, the actuator arm 100 is coupled to an end of the first link arm 94 and to the actuator 72 (not pictured). The first link arm 94 is coupled to the actuator arm 100 at a first end and to the bell crank 98 at a second end. Additionally, the bell crank 98 is further coupled to the housing 78 (via a pin, which will be described below) and to the second link arm 96. The second link arm 96 is coupled to the bell crank 98 at a first end and to the arm 52 at an opposite end. In various embodiments, the respective connections between the components may be pin connections to enable rotation about respective axes.

In the illustrated embodiment, the first link arm 94 is shorter than the second link arm 96. Additionally, the first and second link arms 94, 96 are shorter than the actuator arm 100. It should be appreciated that the various lengths of the link arms 94, 96, actuator arm 100, and size of the bell crank 98 may be particularly selected based on the size of the wellbore and desired output force profile, as will be described below.

Figure 4:
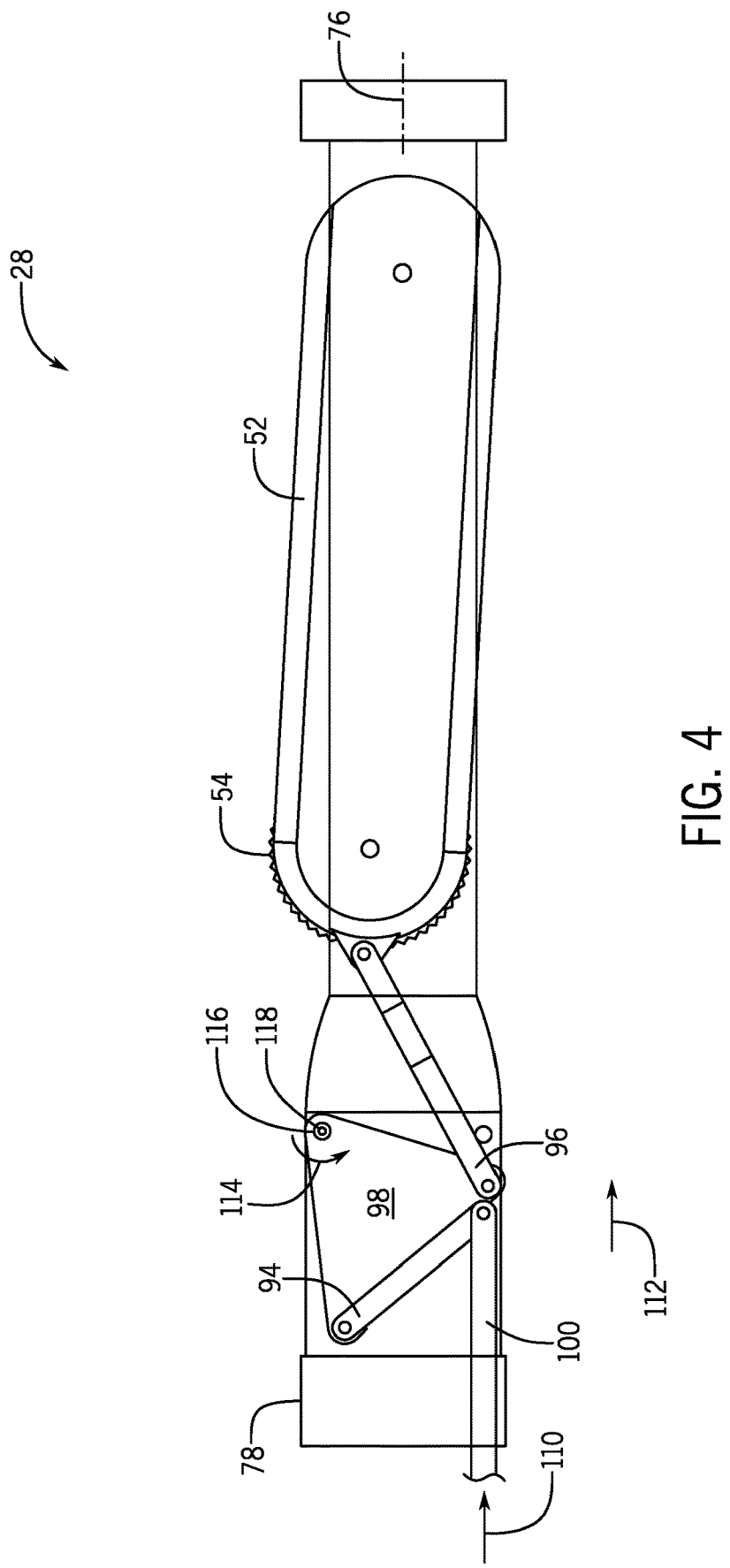
FIG. 4 is a schematic side view of an embodiment of a downhole tooling having a deployment system, in accordance with embodiments of the present disclosure.

FIG. 4 is a schematic side elevation view of an embodiment of the tractor 28 in which the arm 52 is beginning to transition to the deployed position due to a linear force 110 applied via the actuator 72. As shown when compared to the embodiment illustrated in FIG. 3, the actuator arm 100 transitions in a first direction 112, which generates a force on the first link arm 94. The force on the first link arm 94 is transmitted to the bell crank 98, which rotates in a first direction 114 about a pivot point 116. As described about, in various embodiments, the bell crank 98 is coupled to the housing 78 via a pin or journal at the pivot point 116, thereby enabling rotation about a bell crank axis 118. Furthermore, FIG. 4 illustrates movement of the second link arm 96 via the coupling to the bell crank 98.

Figure 5:
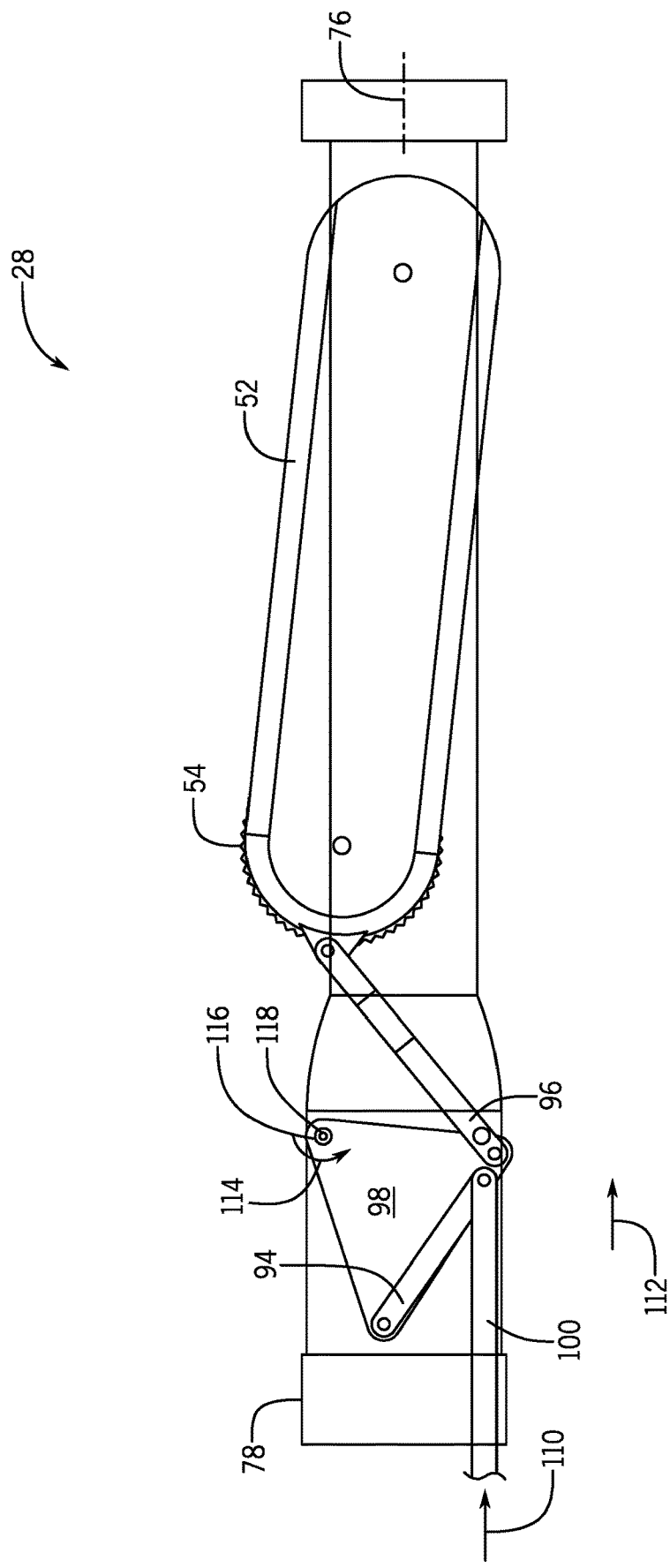
FIG. 5 is a schematic side view of an embodiment of a downhole tooling having a deployment system, in accordance with embodiments of the present disclosure.

FIG. 5 is a schematic side elevation view of an embodiment of the tractor 28 in which the arm 52 continues the transition to the deployed position. In the illustrated embodiment, the radial position of the arm 52 relative to the tool axis 76 is increased when compared to FIGS. 3 and 4. That is, the arm 52, and therefore the wheel 54, is driven radially outward from the tool axis 76. FIG. 5 illustrates further rotation of the bell crank 98 in the first direction 114 via the linear force 110 applied to the actuator arm 100. As illustrated, the actuator arm 100 is farther in the first direction 112 than in the embodiments illustrated in FIGS. 3 and 4.

Figure 6:
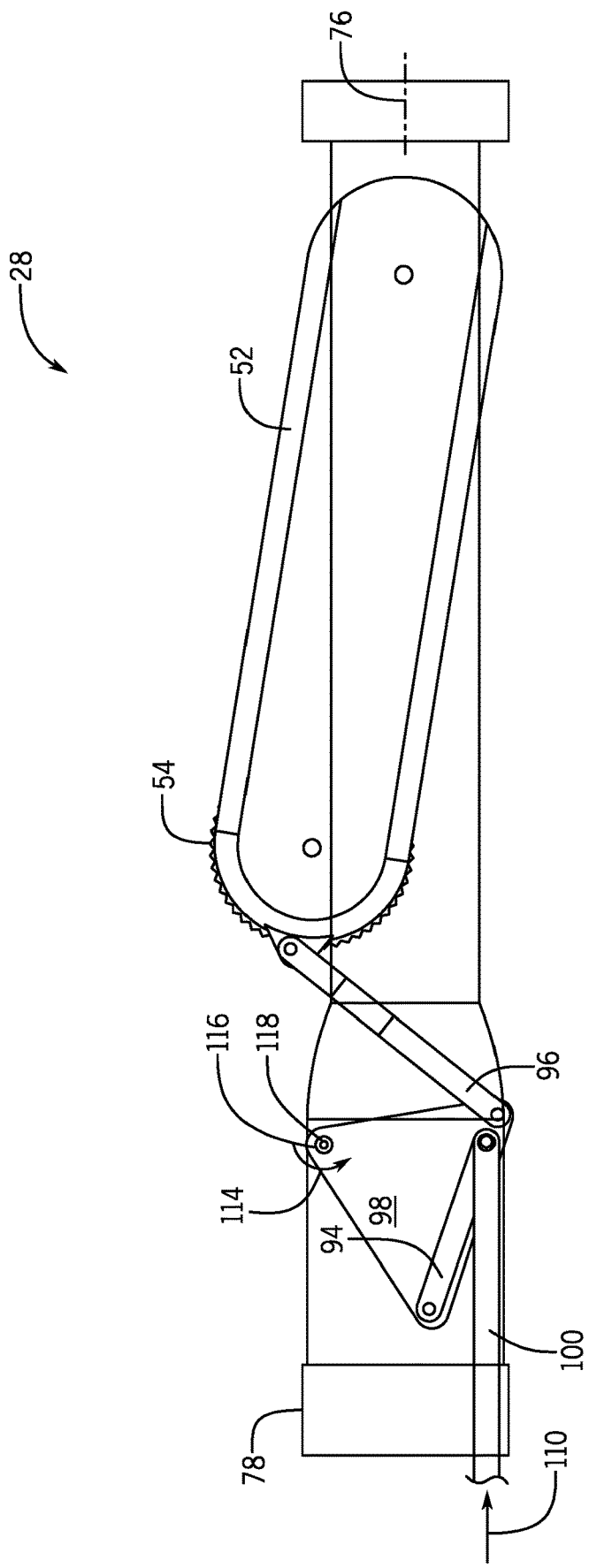
FIG. 6 is a schematic side view of an embodiment of a downhole tooling having a deployment system, in accordance with embodiments of the present disclosure.

FIG. 6 is a schematic side elevation view of an embodiment of the tractor 28 in which the arm 52 continues the transition to the deployed position. In the illustrated embodiment, continued rotation of the bell crank 98 in the first direction 114 about the pivot point 116 drives radial movement of the arm 52 relative to the tool axis 76. As illustrated, the first link arm 94 is substantially aligned with a side of the bell crank 98 and the actuator arm 100 has extended to almost align with the connection between the bell crank 98 and the second link arm 96.

Figure 7:
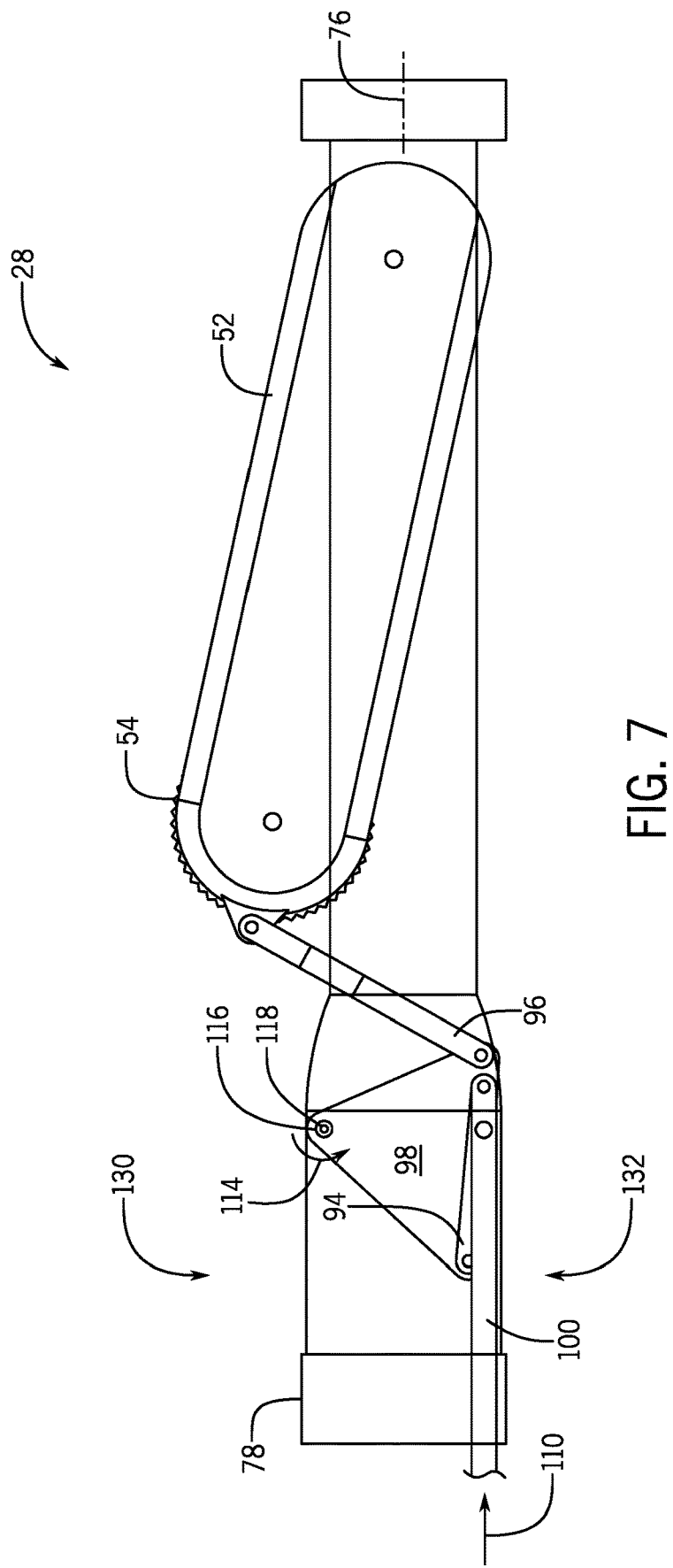
FIG. 7 is a schematic side view of an embodiment of a downhole tooling having a deployment system, in accordance with embodiments of the present disclosure.

FIG. 7 is a schematic side elevation view of an embodiment of the tractor 28 in which the arm 52 continues the transition to the deployed position. In the illustrated embodiment, continued rotation of the bell crank 98 in the first direction 114 about the pivot point 116 drives radial movement of the arm 52 relative to the tool axis 76. Moreover, the connection between the first link arm 94 and the bell crank 98 has transitioned from substantially at a top 130 of the tractor 28 to substantially at a bottom 132 of the tractor 28.

Figure 8:
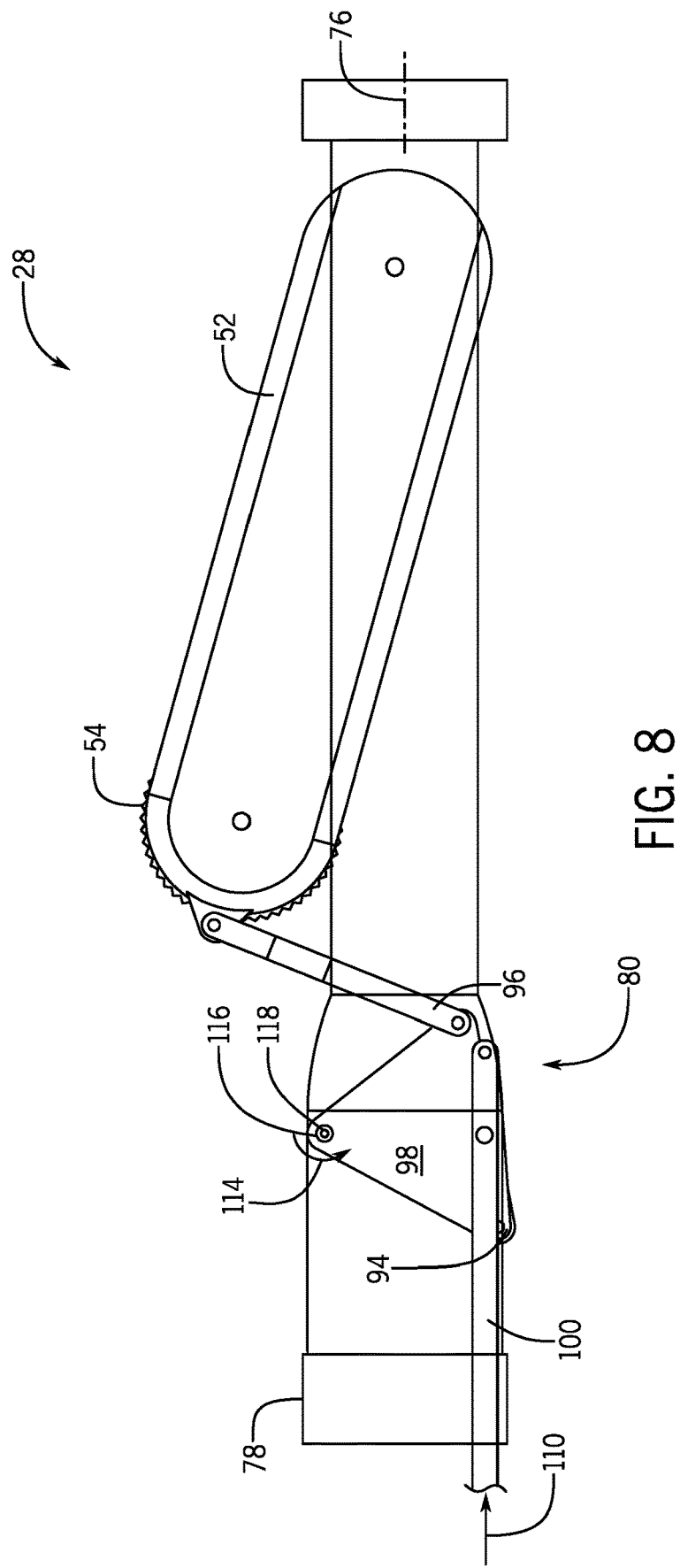
FIG. 8 is a schematic side view of an embodiment of a downhole tooling having a deployment system, in accordance with embodiments of the present disclosure.

FIG. 8 is a schematic side elevation view of an embodiment of the tractor 28 in which the arm 52 continues the transition to the deployed position. In the illustrated embodiment, continued rotation of the bell crank 98 in the first direction 114 about the pivot point 116 drives radial movement of the arm 52 relative to the tool axis 76. Additionally, the connection point between the first link arm 94 and the bell crank 98 has transitioned to extend outside of the tractor 28 through the opening 80.

Figure 9:
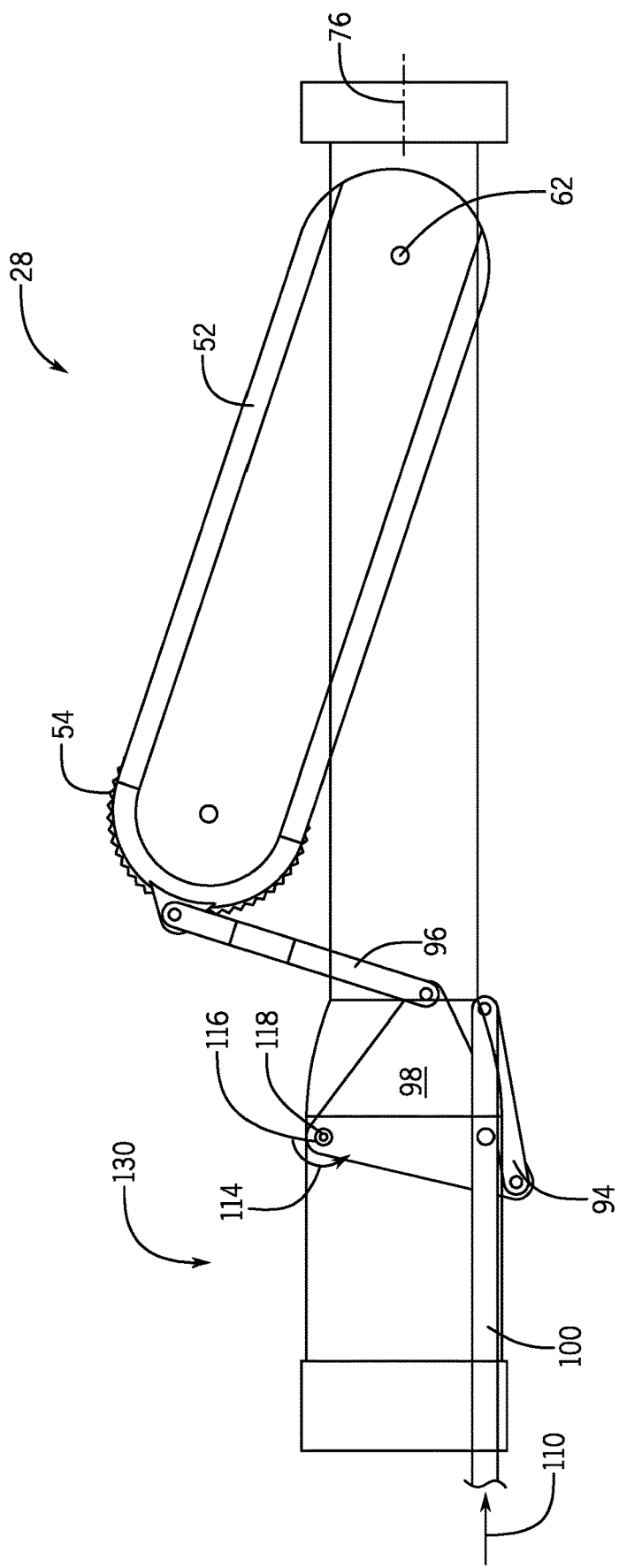
FIG. 9 is a schematic side view of an embodiment of a downhole tooling having a deployment system, in accordance with embodiments of the present disclosure.

FIG. 9 is a schematic side elevation view of an embodiment of the tractor 28 in which the arm 52 continues the transition to the deployed position. In the illustrated embodiment, continued rotation of the bell crank 98 in the first direction 114 about the pivot point 116 drives radial movement of the arm 52 relative to the tool axis 76. In the illustrated embodiment, the actuator arm 100 is positioned radially closer to the tool axis 76 than the first link arm 94. Moreover, the actuator arm 100 is positioned radially closer to the tool axis 76 than the connection point between the first link arm 94 and the bell crank 98. FIG. 9 further illustrates the connection point between the second link arm 96 and the bell crank 98 moving toward the top 130 of the tractor 28 as the deployment arm 52 moves the wheel 54 radially outward from the tool axis 76 via rotation about the deployment axis 62.

Figure 10:
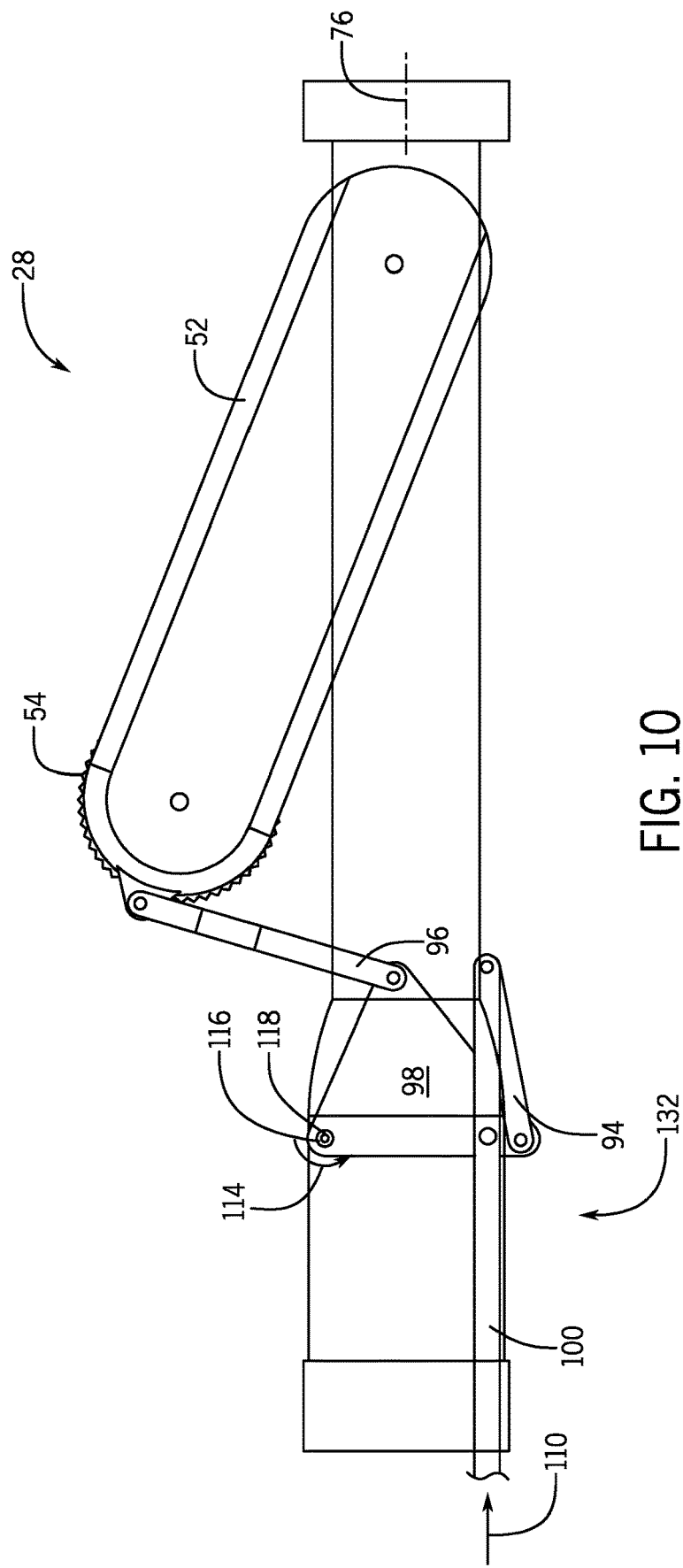
FIG. 10 is a schematic side view of an embodiment of a downhole tooling having a deployment system, in accordance with embodiments of the present disclosure.

FIG. 10 is a schematic side elevation view of an embodiment of the tractor 28 in which the arm 52 continues the transition to the deployed position. In the illustrated embodiment, continued rotation of the bell crank 98 in the first direction 114 about the pivot point 116 drives radial movement of the arm 52 relative to the tool axis 76. In the illustrated embodiment, the linear force 110 drives the actuator arm 100 such that the connection point between the actuator arm 100 and the first link arm 92 is substantially vertically aligned with the connection point between the bell crank 98 and the second link arm 96. The second link arm 96 continues to drive rotation of the arm 52 about the deployment axis 62. As illustrated at least a portion of the bell crank 98, actuator arm 100, and first link arm 94 extend beyond the diameter 92 of the housing 78 and out of the opening 80 at the bottom 132.

Figure 11:
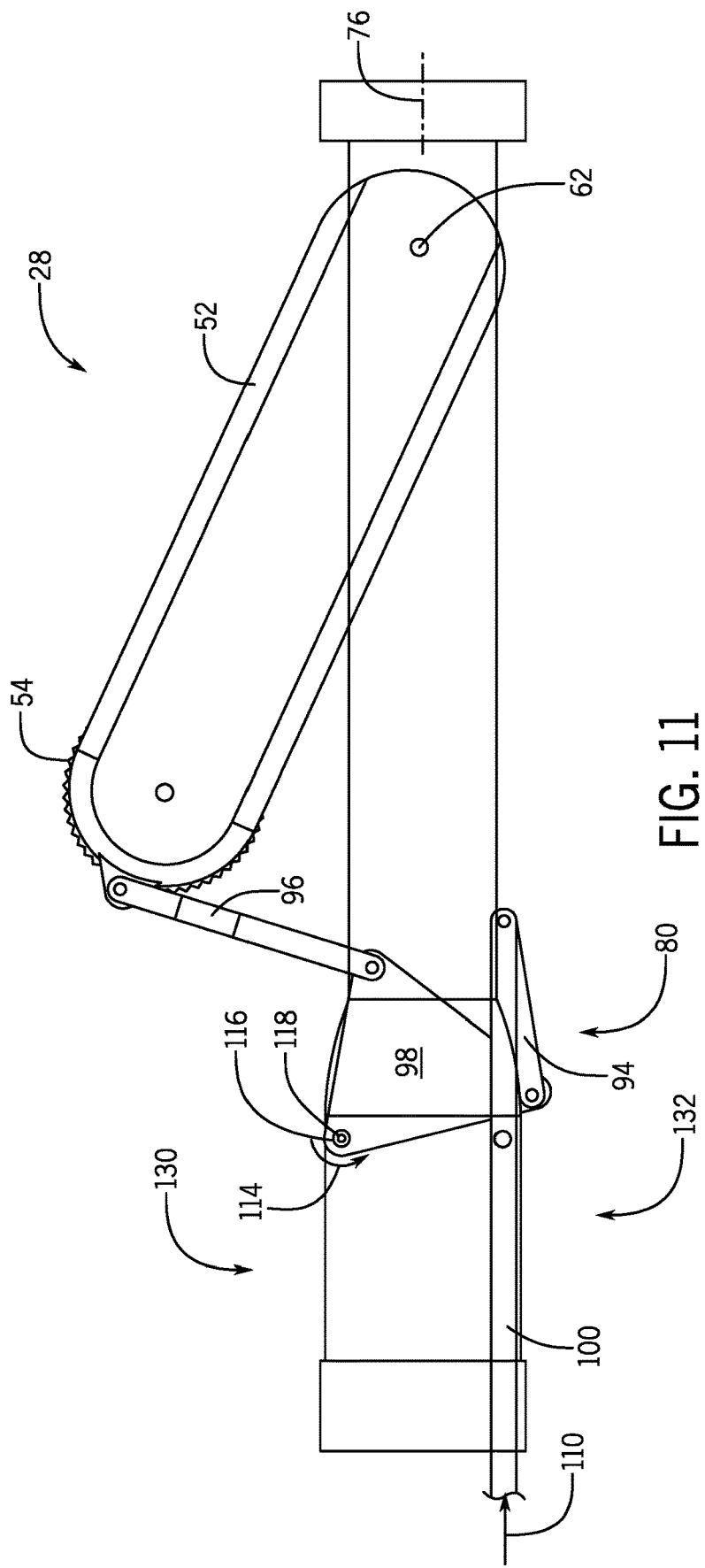
FIG. 11 is a schematic side view of an embodiment of a downhole tooling having a deployment system, in accordance with embodiments of the present disclosure.

FIG. 11 is a schematic side elevation view of an embodiment of the tractor 28 in which the arm 52 continues the transition to the deployed position. In the illustrated embodiment, continued rotation of the bell crank 98 in the first direction 114 about the pivot point 116 drives radial movement of the arm 52 relative to the tool axis 76. As illustrated, the connection point between the bell crank 98 and the second link arm 96 is closer to the top 130 than the embodiment illustrated in FIG. 10. This rotation of the bell crank drives the deployment arm 52 to rotate about the deployment axis 62 and to increase the radial distance between the wheel 54 and the tool axis 76. As illustrated, at least a portion of the bell crank 98, actuator arm 100, and first link arm 94 extend beyond the diameter 92 of the housing 78 and out of the opening 80 at the bottom 132.

Figure 12:
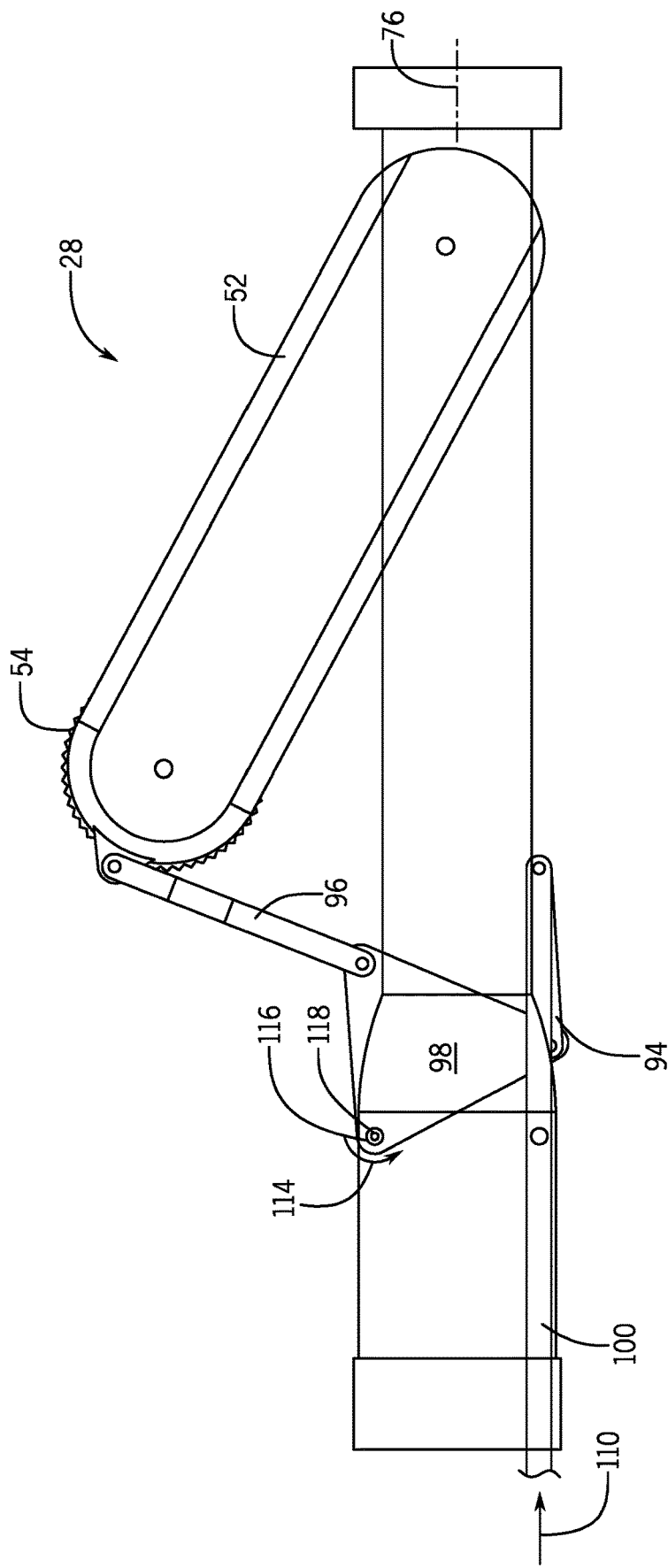
FIG. 12 is a schematic side view of an embodiment of a downhole tooling having a deployment system, in accordance with embodiments of the present disclosure.

FIG. 12 is a schematic side elevation view of an embodiment of the tractor 28 in which the arm 52 continues the transition to the deployed position. In the illustrated embodiment, continued rotation of the bell crank 98 in the first direction 114 about the pivot point 116 drives radial movement of the arm 52 relative to the tool axis 76. The connection point between the bell crank 98 and the second link arm 96 has transitioned to be vertically higher (e.g., farther radially outward from the tool axis 76) than the pivot point 116. As such, the movement of the bell crank 98 drives rotation of the deployment arm 52 about the deployment axis 62.

Figure 13:
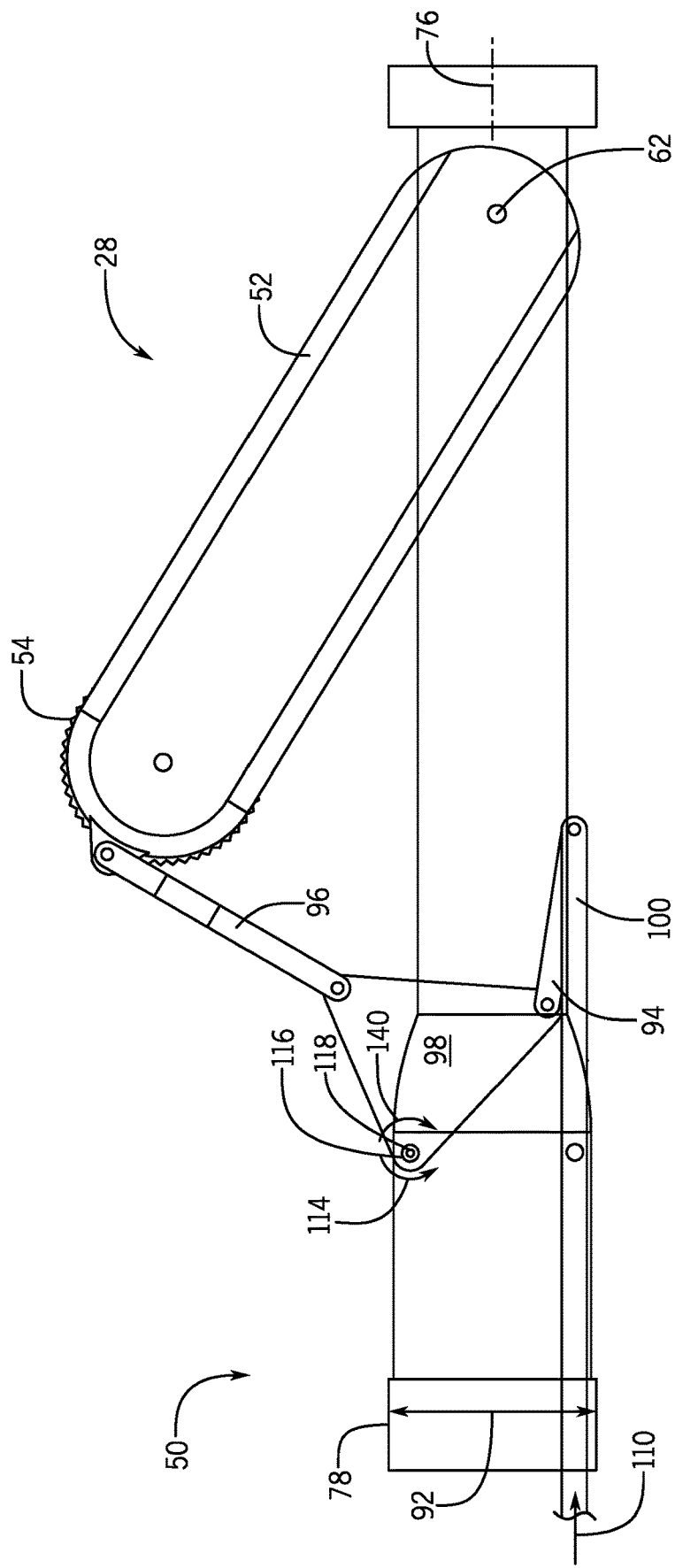
FIG. 13 is a schematic side view of an embodiment of a downhole tooling having a deployment system, in accordance with embodiments of the present disclosure.

FIG. 13 is a schematic side elevation view of an embodiment of the tractor 28 in which the arm 52 is in the deployed position. In the illustrated embodiment, continued rotation of the bell crank 98 in the first direction 114 about the pivot point 116 drives radial movement of the arm 52 relative to the tool axis 76. As shown, rotation about the pivot point 116 has transitioned the connection point between the bell crank 98 and the second link arm 96 to a higher vertical position (e.g., farther radially outward from the tool axis 76) than the pivot point 116. This movement of the connection point transmits the linear force applied by the actuator arm 110 to the deployment arm 52, via the second link arm 96, to drive rotation about the deployment axis 62 to the deployed position. Furthermore, the respective connection points between the bell crank 98 and the first and second link arms 94, 96 are substantially vertically aligned. As illustrated, the actuator arm 100 has further transitioned such that it is arranged within the outer diameter 92 of the housing 78. Accordingly, the deployment arm 52 may be deployed using the deployment system 50. It should be appreciated that the structure of the deployment system 50 enables closure of the deployment arm 52 to the stored position in the event the actuator 72 malfunctions. For example, as the tractor 28 is removed from the wellbore 14, the force applied to the wheel 54 and deployment arm 52 will drive the bell crank 98 to rotate in a section direction 140 about the bell crank axis 118, thereby enabling the storage of the arm 52 as the tractor 28 (which is coupled to or part of the BHA 26 in certain embodiments) is brought to the surface 18. Furthermore, it should be appreciated that the embodiments in FIGS. 3-13 may be flipped to enable deployment from the bottom of the downhole tool, as illustrated in FIG. 1.

Figure 14:
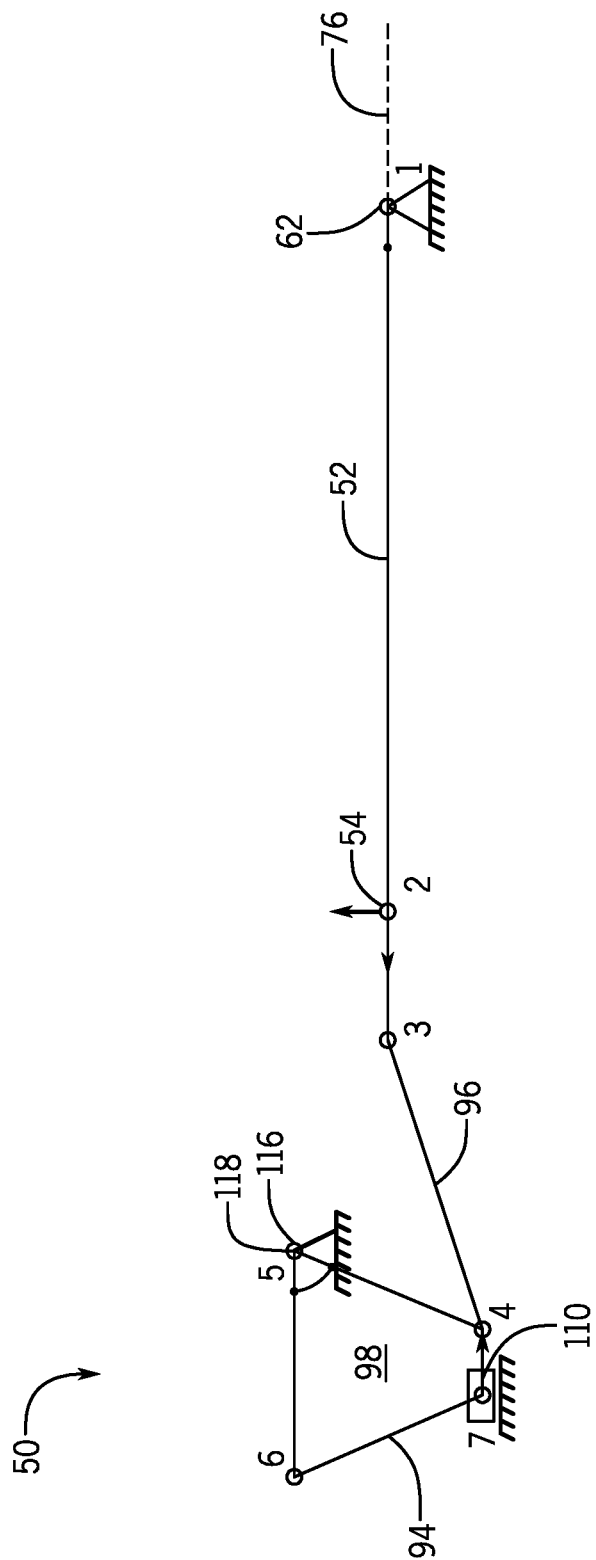
FIG. 14 is a schematic diagram of an embodiment of a deployment system, in accordance with embodiments of the present disclosure.

FIG. 14 is a schematic diagram of an embodiment of the deployment system 50 coupled to the deployment arm 42. In the illustrated embodiment, the wheel 54 is arranged at the marker indicated by "2" along the deployment arm 52, formed by the link 1-3. The system is further illustrated in the schematic diagram such that the first link arm 94 is represented by the link 6-7, bell crank 98 is represented by the shape 4-5-6, and the second link arm 96 is represented by the link 3-4. The linear force 110 is represented by the arrow. As described above, in various embodiments, the relative sizes of the components of the deployment system 50 may be particularly selected to adjust the force output on the deployment arm 52 as a function of the linear force 10. For example, in various embodiments, a substantially constant output force with respect to actuator force may be desirable.

Figure 15:
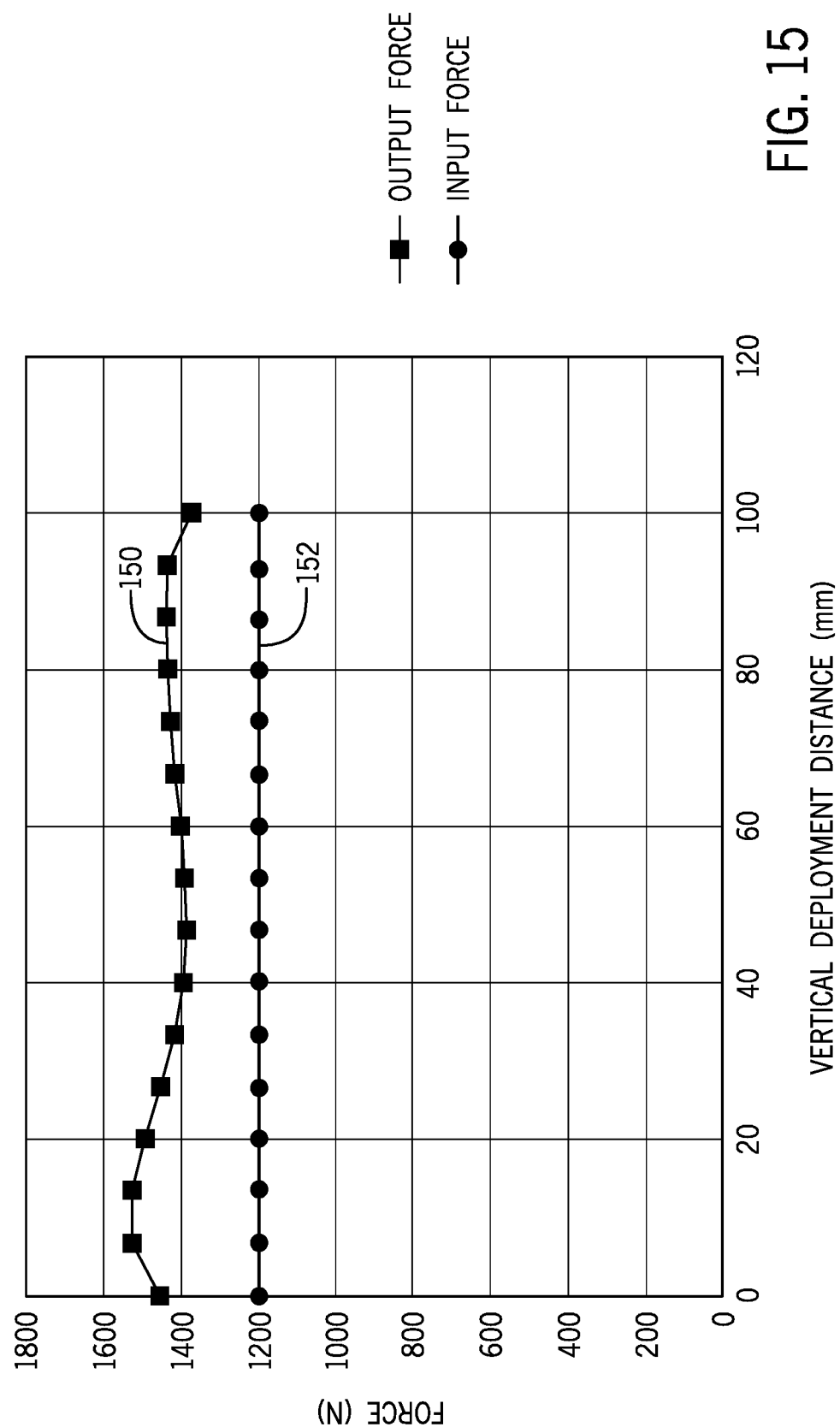
FIG. 15 is a graphical representation of a force output of a deployment system, in accordance with embodiments of the present disclosure.

FIG. 15 is a graphical representation of an embodiment of the deployment system 50 and deployment arm 52 in which an output force 150 is substantially constant as the deployment arm 52 extends radially outward from the tool axis 76. In various embodiments, a constant output force relative to an input force 152 enables the wheel reaction force, and therefore the grip of the tractor 28, to remain essentially constant for any wellbore diameter. To obtain the radial position of the wheel 54, a transfer function relating the position of the actuator 72 to the position of the wheel 54 may be generated. It should be appreciated that the deployment system 50 may be designed to accommodate a particular size of wellbore, and as a result, the actuator 72 deployed may be sized to deploy the arms 52 a predetermined distance to accommodate the particular size of wellbore.

Figure 16:
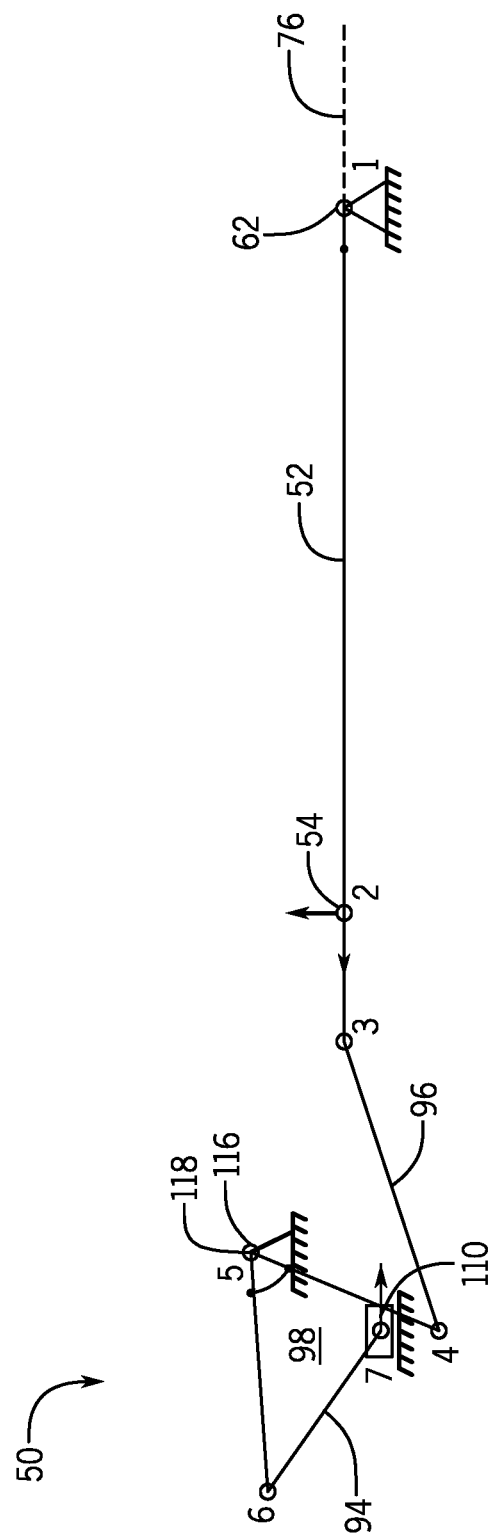
FIG. 16 is a schematic diagram of an embodiment of a deployment system, in accordance with embodiments of the present disclosure.

FIG. 16 is a schematic diagram of an embodiment of the deployment system 50. The arrangement and configuration of the components is similar to that described with respect to FIG. 14, and therefore will not be repeated. In the illustrated embodiment, the deployment system 50 has been designed to produce an increasing output force relative to the input force. For example, as illustrated, the shape of the bell crank 98 is different than the shape of the bell crank 98 in FIG. 14, thereby producing the variable output force. As described above, various parameters of the system may be tuned in order to adjust the output forces relative to the input forces.

Figure 17:
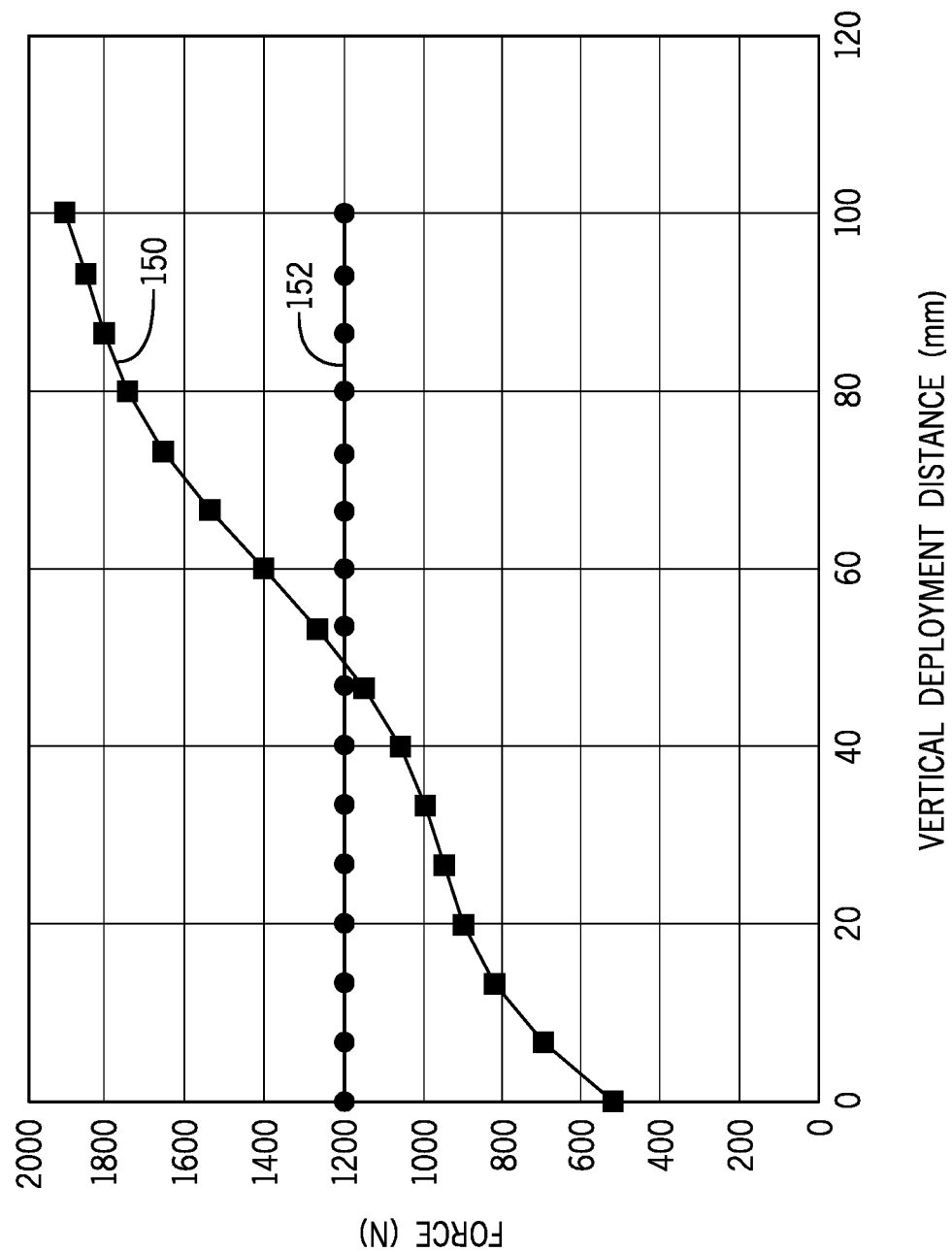
FIG. 17 is a graphical representation of a force output of a deployment system, in accordance with embodiments of the present disclosure.

FIG. 17 is a graphical representation of an embodiment of the deployment system 50 and deployment arm 52 in which the output force 150 increases as the deployment arm 52 extends radially outward from the tool axis 76, even as the input force 152 remains substantially constant. As described above, a relationship between the actuator 72 position (e.g., input force 152) and the deployment arm 52 may be established such that a known input force 152 may be used to correlate to an anticipated radial position of the deployment arm 52.

Figure 18:
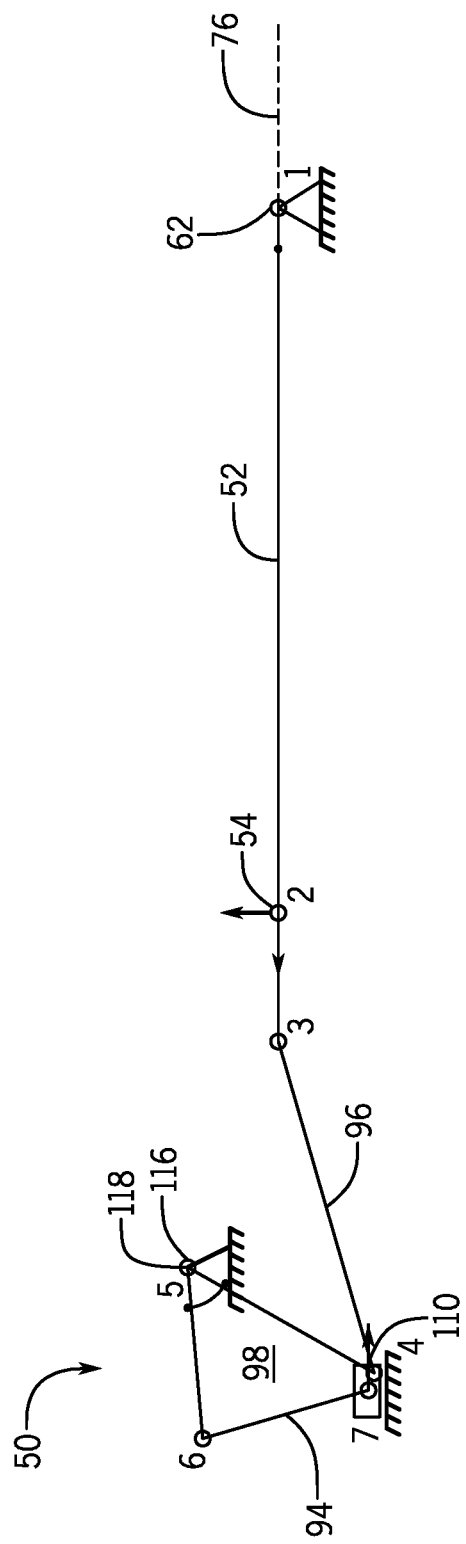
FIG. 18 is a schematic diagram of an embodiment of a deployment system, in accordance with embodiments of the present disclosure.

FIG. 18 is a schematic diagram of an embodiment of the deployment system 50. The arrangement and configuration of the components is similar to that described with respect to FIG. 14, and therefore will not be repeated. In the illustrated embodiment, the shape of the bell crank 98 and the lengths of the first and second link arms 94, 96 are modified to produce a variable output force. For example, the illustrated arrangement would produce a decreased output force, even as the input force remained substantially constant.

Figure 19:
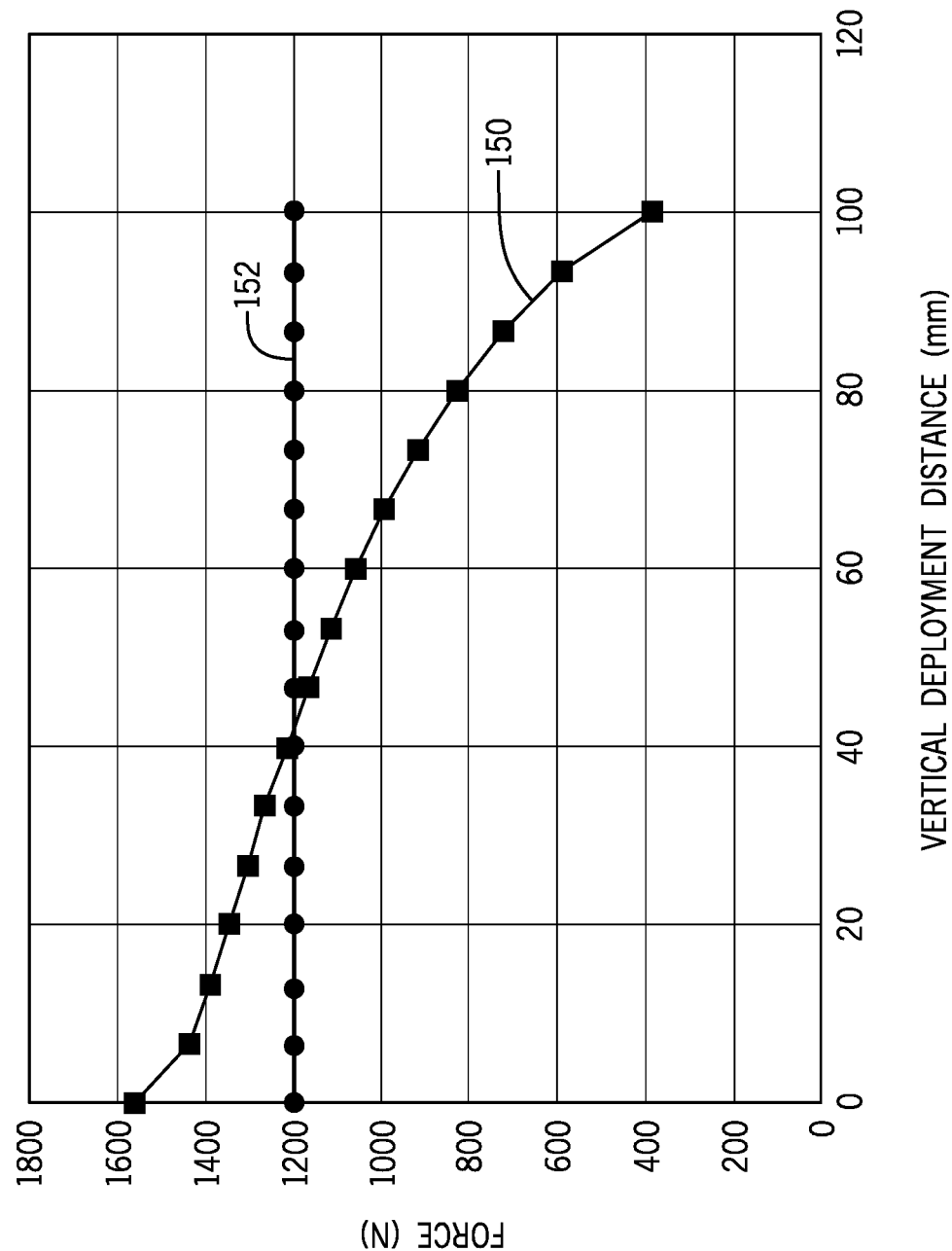
FIG. 19 is a graphical representation of a force output of a deployment system, in accordance with embodiments of the present disclosure.

FIG. 19 is a graphical representation of an embodiment of the deployment system 50 and deployment arm 52 in which the output force 150 decreases as the deployment arm 52 extends radially outward from the tool axis 76, even as the input force 152 remains substantially constant. As described above, a relationship between the actuator 72 position (e.g., input force 152) and the deployment arm 52 may be established such that a known input force 152 may be used to correlate to an anticipated radial position of the deployment arm 52.

As illustrated above, the deployment system 50 may be described as being "tunable" because adjustments to various components in the system may be utilized to change one or more operating parameters. Furthermore, in various embodiments, the deployment system 50 may be particularly designed based on anticipated wellbore conditions, thereby providing an anticipated range of operation.

FIG. 20 is a flow chart of an embodiment of a method 170 for deploying arms 52 using a tunable deployment system 50. It should be understood that, for any process or method described herein, that there can be additional, alternative, or fewer steps performed in similar or alternative orders, or concurrently, within the scope of the various embodiments unless otherwise specifically stated. In the illustrated embodiment, the desired deployment ratio is determined (block 172). For example, it may be determined whether the deployment system 50 should operate with a constant output, an increasing output, or a decreasing out. Parameters of the system may then be tuned based on the determined deployment ratio (block 174). For example, one or more components may be adjusted to achieve the desired deployment ratio. Thereafter, the deployment system 50 may be installed within the tractor 28 and arranged on a downhole tool (block 176). For example, the tractor 28 may be arranged on the BHA 26 of a wireline system. Next, the tractor 28 is arranged within a wellbore (block 178). Thereafter, the deployment system 50 may be activated to move the arms 52 to the deployed position (block 180). For example, the deployment system 50 may be used with deviated wellbores where the force of gravity and/or fluid may be insufficient to drive movement of the BHA 26.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A system for radially extending a deployment arm of a downhole tractor, the system comprising:
   an actuator that supplies a linear force along a tractor axis;
   an actuator arm coupled to the actuator at a first end and a first link arm at the second end, the actuator arm translating the linear force to the first link arm;
   a crank rotationally coupled to a housing of the downhole tractor, the crank being coupled to the first link arm; and
   a second link arm coupled to the crank at a first end and to the deployment arm at a second end, the second link arm translating rotational movement of the crank to the deployment arm to drive rotational movement of the deployment arm about a deployment axis.

2. The system of claim 1, further comprising:
   a wheel coupled to the deployment arm, the wheel arranged on an end opposite the deployment axis.

3. The system of claim 1, wherein the housing comprises an opening extending therethrough, the deployment arm extending out of the housing through the opening as the deployment arm is driven to rotate about the deployment axis.

4. The system of claim 1, wherein a length of the first link arm, a length of the second link arm, and a size of the crank are configured to provide a substantially constant force output to the deployment arm during movement of the deployment arm from a stored position to a deployed position.

5. The system of claim 1, wherein a length of the first link arm, a length of the second link arm, and a size of the crank are configured to provide an increasing force output to the deployment arm during movement of the deployment arm from a stored position to a deployed position.

6. The system of claim 1, wherein a length of the first link arm, a length of the second link arm, and a size of the crank are configured to provide a decreasing force output to the deployment arm during movement of the deployment arm from a stored position to a deployed position.

7. The system of claim 1, further comprising a sensor arranged proximate the actuator, wherein the sensor measures a position of the actuator.

8. The system of claim 1, further comprising a second deployment arm arranged on the tractor, the first and second plurality of deployment arms arranged at a circumferential offset from one another.

9. The system of claim 8, wherein the first deployment arm and the second deployment arm rotate about a common axis.

10. A deployment system for a tractor, the deployment system comprising:

an actuator, the actuator providing force in a linear direction substantially parallel to a tractor axis;

an actuator arm coupled to the actuator;

a crank rotatably coupled to at least a portion of the tractor at a pivot point;

a first link arm coupled to the actuator arm at a first end and the crank at a second end, the coupling to the crank being proximate a top of the tractor and substantially aligned with the pivot point; and a second link arm coupled to the crank at a first end and a deployment arm at a second end, the second link arm transmitting rotational movement of the crank to the deployment arm.

11. The deployment system of claim 10, wherein movement of the actuator arm in a first direction induces rotation of the crank in a first rotational direction via a force applied by the first link arm.

12. The deployment system of claim 10, wherein the first link arm and the second link arm are rotationally coupled to the crank.

13. The deployment system of claim 10, wherein the pivot point is proximate a first vertex of the crank, the coupling to the first link arm is proximate a second vertex of the crank, and the coupling to the second link arm is proximate a third vertex of the crank.

14. The deployment system of claim 10, wherein a length of the first link arm, a length of the second link arm, and a size of the crank are configured to provide a substantially constant force output to the deployment arm during movement of the deployment arm from a stored position to a deployed position.

15. The deployment system of claim 10, wherein a length of the first link arm, a length of the second link arm, and a size of the crank are configured to provide an increasing force output to the deployment arm during movement of the deployment arm from a stored position to a deployed position.

16. The deployment system of claim 10, wherein a length of the first link arm, a length of the second link arm, and a size of the crank are configured to provide a decreasing force output to the deployment arm during movement of the deployment arm from a stored position to a deployed position.

17. The deployment system of claim 10, wherein rotational movement of the crank between a first position and a second position drives the deployment arm from a stored position to a deployed position.

* * * * *